United States Patent
Tabet et al.

(10) Patent No.: US 10,972,247 B2
(45) Date of Patent: *Apr. 6, 2021

(54) REFERENCE SUBFRAMES FOR SYNCHRONIZATION AND CELL MEASUREMENTS

(71) Applicant: Apple Inc., Cupertino, CA (US)

(72) Inventors: Tarik Tabet, Los Gatos, CA (US); Farouk Belghoul, Campbell, CA (US); S. Aon Mujtaba, Santa Clara, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/892,901

(22) Filed: Jun. 4, 2020

(65) Prior Publication Data

US 2020/0304282 A1 Sep. 24, 2020

Related U.S. Application Data

(63) Continuation of application No. 14/496,949, filed on Sep. 25, 2014, now Pat. No. 10,693,623.

(Continued)

(51) Int. Cl.
*H04J 3/06* (2006.01)
*H04L 7/00* (2006.01)
(Continued)

(52) U.S. Cl.
CPC .......... *H04L 7/0016* (2013.01); *H04L 5/0048* (2013.01); *H04L 5/0073* (2013.01); *H04L 43/0852* (2013.01)

(58) Field of Classification Search
None
See application file for complete search history.

(56) References Cited

U.S. PATENT DOCUMENTS

| 8,774,290 | B2 | 7/2014 | Nogami |
| 10,693,623 | B2 | 6/2020 | Tabet |

(Continued)

FOREIGN PATENT DOCUMENTS

| CN | 1891000 A | 1/2007 |
| CN | 102036264 A | 4/2011 |

(Continued)

OTHER PUBLICATIONS

Notice of Allowance, Korean Patent Application No. 10-2016-7023525, dated Jul. 30, 2018, 2 pages.

(Continued)

*Primary Examiner* — Willie J Daniel, Jr.
(74) *Attorney, Agent, or Firm* — Kowert, Hood, Munyon, Rankin & Goetzel, P.C.

(57) ABSTRACT

This disclosure relates to using a dedicated reference subframes in a cellular communication system. According to one embodiment, a base station may transmit reference signals in a dedicated synchronization and measurement reference subframe. Neighboring base stations may also transmit reference signals in dedicated reference subframes in a temporally coordinated (synchronized) manner. The reference signals transmitted be each base station may be orthogonal with the reference signals transmitted by each neighboring base station. The reference subframes may be transmitted periodically, and data subframes may be transmitted between reference subframes. Some or all of the data subframes may not include cell-specific reference symbols, as their function may be unnecessary given the use of the dedicated reference subframes.

20 Claims, 5 Drawing Sheets

Related U.S. Application Data

(60) Provisional application No. 61/933,919, filed on Jan. 31, 2014.

(51) Int. Cl.
*H04L 5/00* (2006.01)
*H04L 12/26* (2006.01)

(56) References Cited

U.S. PATENT DOCUMENTS

| | | |
|---|---|---|
| 2009/0252077 A1 | 10/2009 | Khandekar et al. |
| 2010/0080139 A1 | 4/2010 | Palanki et al. |
| 2010/0260156 A1 | 10/2010 | Lee et al. |
| 2010/0273506 A1 | 10/2010 | Stern-Berkowitz et al. |
| 2010/0322176 A1 | 12/2010 | Chen |
| 2010/0322227 A1 | 12/2010 | Luo |
| 2011/0141987 A1 | 6/2011 | Nam et al. |
| 2013/0083780 A1 | 4/2013 | Luo |
| 2013/0107704 A1 | 5/2013 | Dinan |
| 2013/0128765 A1 | 5/2013 | Yang et al. |
| 2013/0170376 A1 | 7/2013 | Dinan |
| 2013/0279396 A1 | 10/2013 | Seo |
| 2014/0219131 A1 | 8/2014 | Yang et al. |
| 2015/0222414 A1* | 8/2015 | Tabet ............... H04L 43/0852 370/350 |

FOREIGN PATENT DOCUMENTS

| | | |
|---|---|---|
| CN | 103190104 A | 7/2013 |
| EP | 2445260 A1 | 4/2012 |
| KR | 1020090074831 | 7/2009 |
| WO | WO 01/86486 A2 | 11/2001 |
| WO | WO 2011-074807 A2 | 6/2011 |
| WO | 2011/126025 | 10/2011 |
| WO | WO 2012/150665 | 11/2012 |
| WO | 2013/050895 | 4/2013 |
| WO | 2013/141624 | 9/2013 |

OTHER PUBLICATIONS

Office Action, Chinese Application for Invention No. 201580006137.0, dated Aug. 23, 2018, 9 pages.
International Search Report and Written Opinion from PCT/US2015/011311, dated Apr. 8, 2015, Apple Inc., pp. 1-13.
Written Opinion of the International Preliminary Examining Authority, Application No. PCT/US2015/011311, dated Jan. 20, 2016, 6 pages.
Office Action, Taiwan Application No. 104103337, dated Jan. 29, 2016, 11 pages.
Office Action, Japanese Application No. 2016-544454, dated Aug. 25, 2017, 3 pages.
Nokia Siemens Networks, Nokia; "General Considerations on New Carrier Types"; 3GPP TSG RAN WG1 #68, R1-120832; Dresden, Germany; Feb. 6-10, 2012; five pages.
Office Action, Japanese Application No. 2016-544454, dated Mar. 23, 2018, 5 pages.
Samsung, "Support of the time domain ICIC in Rel-10", 3GPP TSG RAN WG1 Meeting #62bis, Oct. 11, 2010, four pages.
"Physical Channels and Modulation," (Release 12), 3GPP TS 36.211 V12.0.0 (Dec. 2013), Dec. 20, 2013, pp. 87-107.
Notice of Allowance, Japanese Patent Application No. 2016-544454, dated Jan. 28, 2019, three pages.

* cited by examiner

US 10,972,247 B2

REFERENCE SUBFRAMES FOR SYNCHRONIZATION AND CELL MEASUREMENTS

PRIORITY CLAIM

The present application is a continuation of U.S. patent application Ser. No. 14/496,949, entitled "Reference Subframes for Synchronization and Cell Measurements," filed Sep. 25, 2014, which claims benefit of priority to U.S. Provisional Application No. 61/933,919 titled "Reference Subframes for Synchronization and Cell Measurements" and filed on Jan. 31, 2014, which are hereby incorporated by reference in their entirety as though fully and completely set forth herein.

FIELD

The present application relates to wireless devices, and more particularly to a system and method for providing reference subframes for synchronization and cell measurement purposes in a cellular communication system.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. Many such wireless communication standards provide for the use of known signals (e.g., pilot or reference signals) for a variety of purposes, such as synchronization, measurements, equalization, control, etc.

SUMMARY

Embodiments are presented herein of, inter alia, methods for providing reference subframes in a cellular communication system, and of devices configured to implement the methods.

According to the techniques disclosed herein, base stations may coordinate to periodically provide a synchronized dedicated reference subframe which may be used by wireless devices for various synchronization and measurement purposes. Each base station's reference subframe may include control information regarding neighboring cells to facilitate neighbor cell measurement by UEs served by that base station.

In order to provide robustness against interference across cells (in particular given that the dedicated reference subframes of neighbor cells may be synchronized to occur at the same time), each base station may use reference signals which are orthogonal to the reference signals used by its neighbor base stations. For example, different cyclic shifts of Zadoff-Chu root sequences might be used by different base stations.

By providing such reference signals in a single dedicated subframe, the base stations may be freed from the need to include cell-specific reference symbols in other (e.g., data) subframes, at least in some instances. This may result in more efficient spectrum usage, and at least in some circumstances may also result in power consumption savings by network infrastructure equipment and/or user devices.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
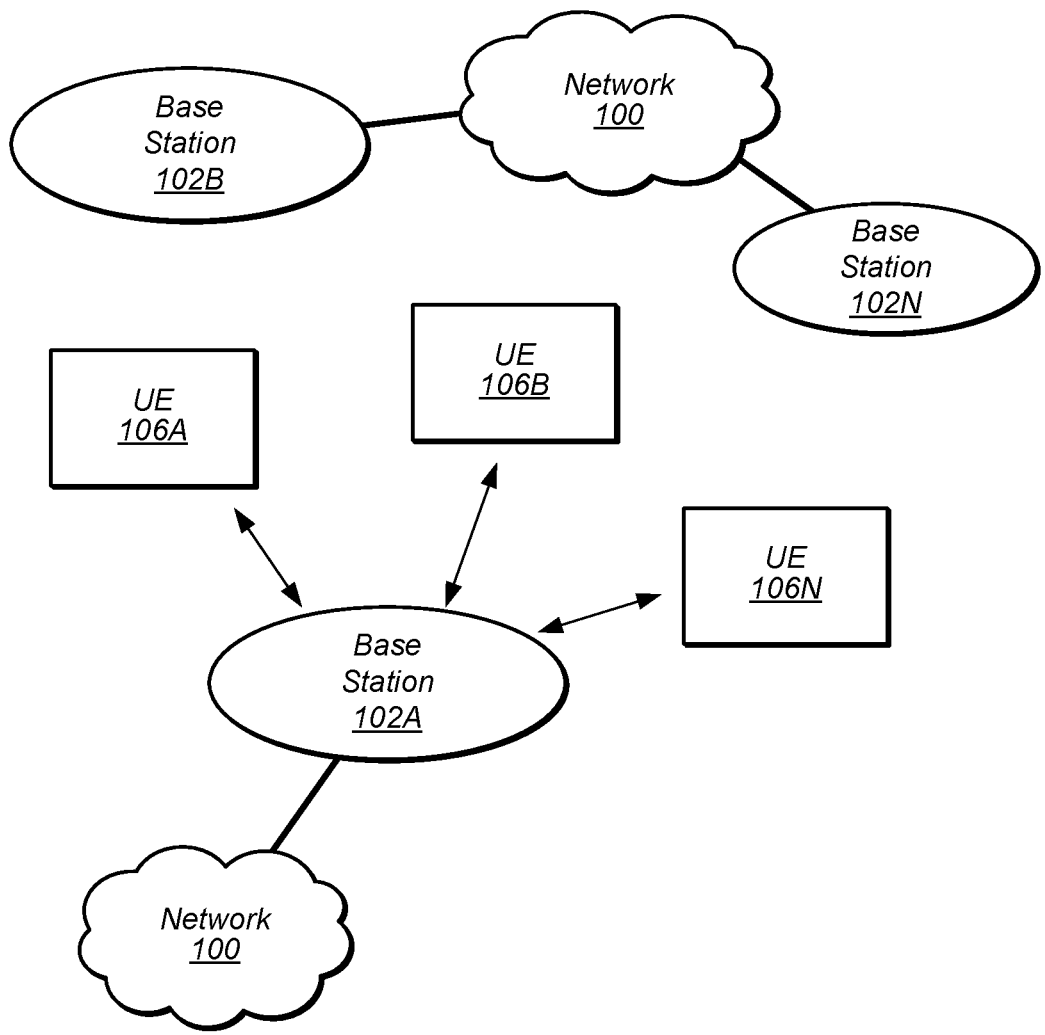
FIG. 1 illustrates an exemplary (and simplified) wireless communication system, according to one embodiment.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
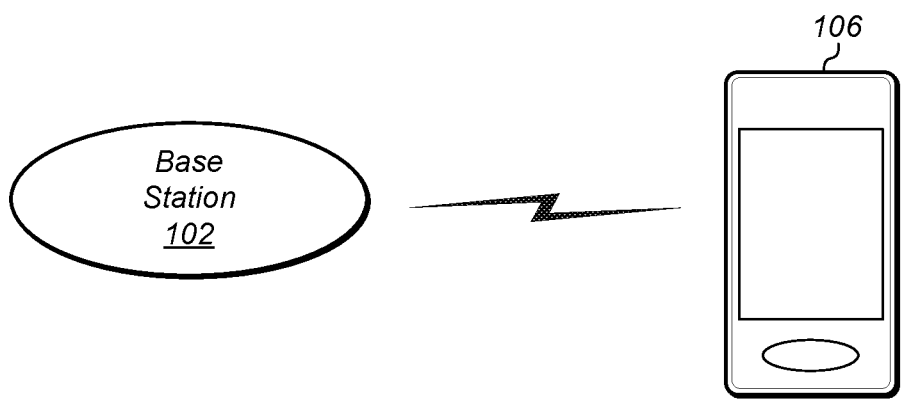
FIG. 2 illustrates a base station ("BS", or "eNodeB" or "eNB" in an LTE context) in communication with a user equipment ("UE") device, according to one embodiment.

FIGS. 1 and 2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may provide a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to one embodiment. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
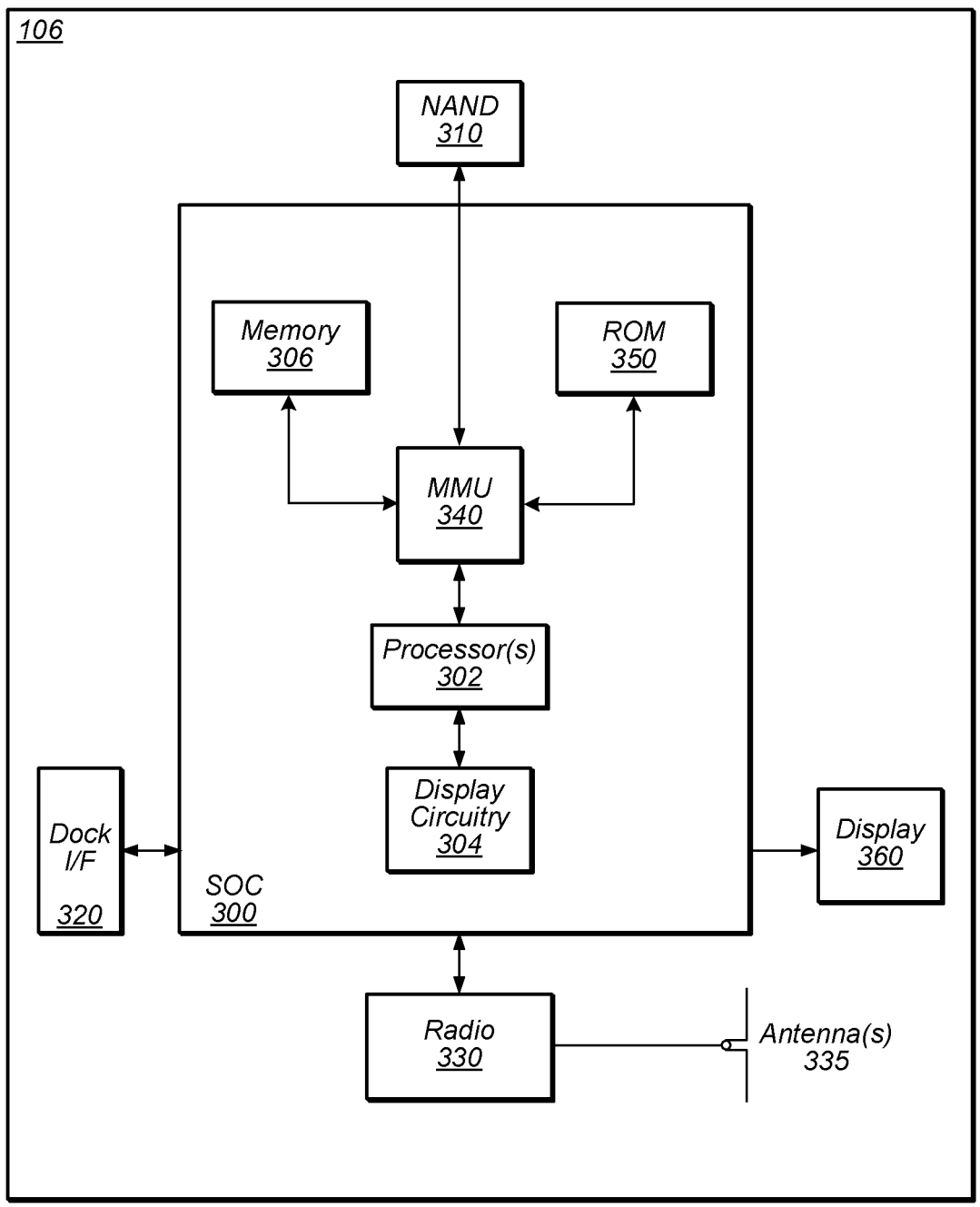
FIG. 3 illustrates an exemplary block diagram of a UE, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication standards in some embodiments.

As described further subsequently herein, the UE 106 may include hardware and software components for implementing features relating to the use of dedicated measurement/synchronization subframes in a cellular communication system, such as those described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 4:
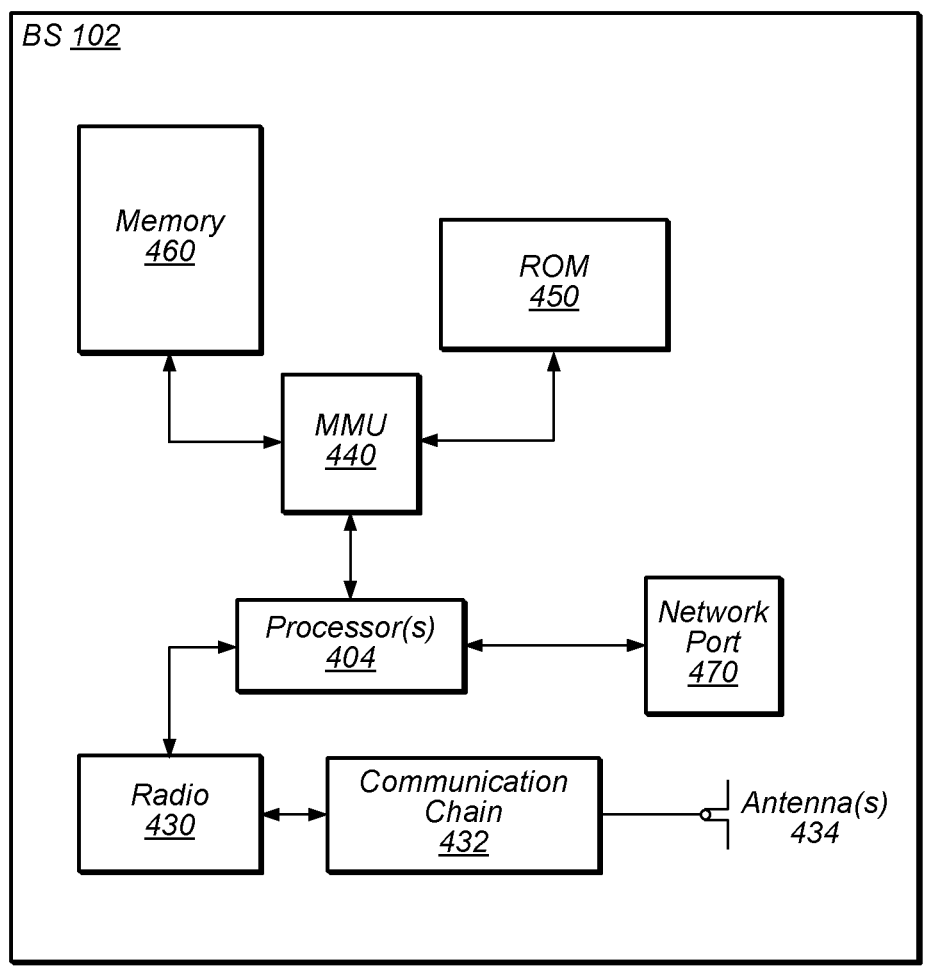
FIG. 4 illustrates an exemplary block diagram of a BS, according to one embodiment.

FIG. 4—Exemplary Block Diagram of a Base Station

FIG. 4 illustrates an exemplary block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio, which is capable of performing communications according to any of multiple wireless communication technologies (e.g., LTE and Wi-Fi; LTE and UMTS; LTE and CDMA2000; UMTS and GSM; etc.).

As described further subsequently herein, the BS 102 may include hardware and software components for implementing features relating to the use of dedicated measurement/synchronization subframes in a cellular communication system, such as those described herein with reference to, inter alia, FIG. 6. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein, such as the features described herein with reference to, inter alia, FIG. 6.

Figure 5:
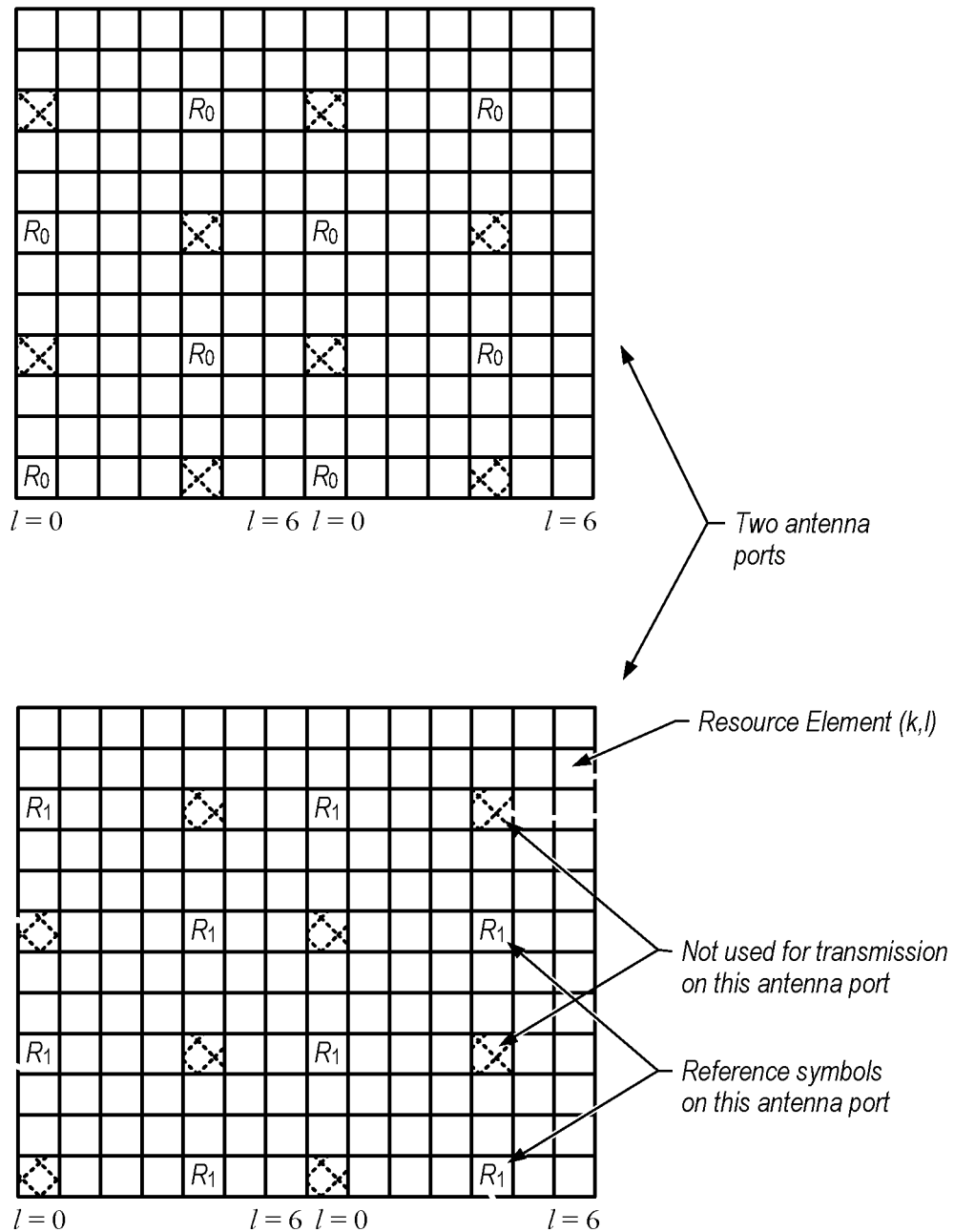
FIG. 5 illustrates an exemplary reference symbol structure in which cell-specific reference symbols are transmitted in each subframe, according to one embodiment.

FIG. 5—Exemplary Cell-Specific Reference Symbol Structure

According to current implementations of LTE, cell specific reference symbols (CRS) are transmitted in every subframe, even if there is no UE allocation in the subframe. CRS may be provided, among various purposes, for UE tracking loops (such as time tracking loops, frequency tracking loops, Doppler and signal to interference plus noise (SINR) estimation loops, channel estimation, etc.), serving and neighboring cell measurements (e.g., RSRP/RSRQ measurements), demodulation of certain control channels (e.g., PHICH, PDCCH, PCFICH, PBCH), and certain legacy transmission modes for the physical downlink shared channel (PDSCH) that require CRS and less than 4 transmit antennas (e.g., transmission modes 1-6).

FIG. 5 illustrates an exemplary subframe reference symbol structure in which cell-specific reference symbols are provided, according to one embodiment. As shown in FIG. 5, on each antenna port, certain resource elements of each subframe are used for transmission of cell-specific reference symbols, and certain resource elements of each subframe are left unused to avoid interference with transmission of cell-specific reference symbols on the other antenna port.

Use of CRS impacts LTE systems in a variety of ways. As one example, the current use of CRS by LTE cells in all subframes, including those in which no resources are allocated to communication with UEs by those cells, may cause significant interference for small cell (i.e., smaller than macro cell, e.g., micro cell, pico cell, femto cell) deployment scenarios. For example, since all such (small) cells may be system frame number (SFN) aligned, this may create interference, especially in the case of heterogeneous deployments where a Macro Cell is interfering with an adjacent small cell, since there may be a transmit power differential between the macro cell and the small cell. Furthermore, at least in some instances small cells may rely on almost blank subframe (ABS) scheduling and corresponding lack of interference from the macro cell in order to perform communications with its UEs, but since CRS may still be transmitted in an ABS subframe, interference from CRS in an ABS subframe may still impact decoding of the PDCCH in the small cell and possibly/eventually the PDSCH, even though the interference from the PDCCH and PDSCH in the macro cell may have been removed.

As another example, for an LTE cell provided on an unlicensed frequency band (e.g., an LTE-U deployment), if the cell transmits CRS signals on a particular frequency even if the cell is not scheduling any data for its UEs, this may create interference on any Wi-Fi access point that is trying to access that frequency. In contrast, if such a cell could go entirely silent during periods of time when no data communications are being performed by the cell on a given frequency, Wi-Fi devices may be able to more readily access that frequency such that Wi-Fi and LTE-U may be able to successfully coexist in that unlicensed frequency band.

Furthermore, the use of CRS has an impact on the total spectral efficiency of an LTE cell; each resource element on which a reference symbol is transmitted represents one less resource element, which can be allocated to data communication. Additionally, the use of CRS to support cell measurements and synchronization functions impacts UE power consumption, since in order for UEs to effectively use CRS for such functions, those CRS may need to be monitored on an ongoing basis.

Figure 6:
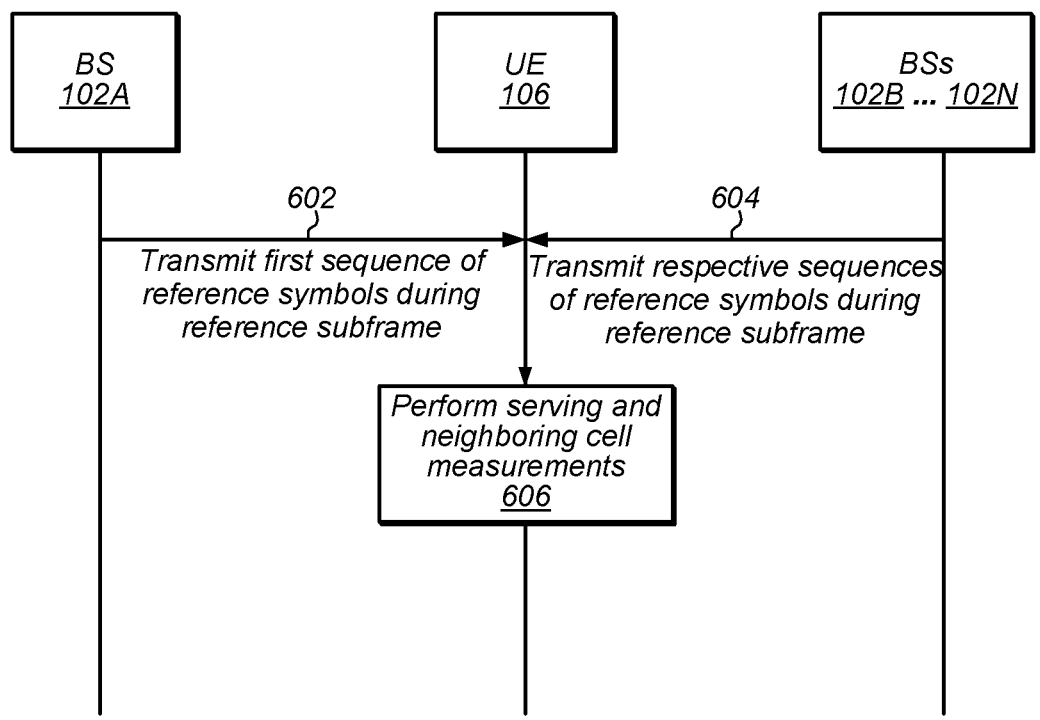
FIG. 6 is a communication flow diagram illustrating an exemplary method for using a periodic dedicated synchronization/measurement subframe in a wireless communication system, according to one embodiment.

FIG. 6—Communication Flow Diagram

Given such notable impacts on system function, it would be desirable to provide a way of achieving the functions of CRS while mitigating the drawbacks.

One such technique could include providing a periodic dedicated reference subframe. Such a subframe may contain sufficient reference information (e.g., as a sequence of reference symbols or other reference signal) to enable accurate tracking loop updates and RSRP/RSRQ measurements. Furthermore, such a reference subframe may be synchronized across all cells, e.g., in order to facilitate the possibility that a UE may perform measurements on both its serving cell and any neighboring cells, and may further include control information about some or all neighboring cells for such a purpose.

As a further consideration, in order to ensure robustness against interference across adjacent cells, reference signals or "measurement signals" used by different cells during the reference subframe may be designed to be orthogonal.

Overall, such a scheme may save spectral efficiency, reduce interference, and reduce UE power consumption. FIG. 6 is a communication/signal flow diagram illustrating such a scheme for providing coordinated reference subframes by cellular base stations, according to one embodiment. The scheme shown in FIG. 6 may be used in conjunction with any of the computer systems or devices shown in the above Figures, among other devices. Note that while the scheme shown in FIG. 6 may be used in conjunction with LTE systems (such as described with respect to FIG. 5) as one possibility, it may also be possible to use such a scheme (or a variation thereon) in conjunction with any of various other cellular systems, as desired.

As shown, according to the scheme a "first" BS 102A and neighboring BSs 102B . . . 102N (e.g., such as illustrated in and described with respect to FIGS. 1-2 and 4) may each provide respective measurement signals in a time synchronized manner for measurement, synchronization, control and/or other purposes. A "first" UE 106 (e.g., such as illustrated in and described with respect to FIGS. 1-3) may perform serving and neighboring cell measurements, synchronization functions, and/or receive control information by way of the dedicated reference subframes.

Note that in various embodiments, some of the elements of the scheme shown may be performed concurrently, in a different order than shown, or may be omitted. Additional elements may also be performed as desired. As shown, the scheme may operate as follows.

In 602, the first BS 102A may transmit a first measurement signal during a reference subframe.

In 604, each neighboring BS 102B-N of the first BS 102A may transmit a respective measurement signal during the reference subframe. The first BS 102A and the neighboring BSs 102B-N may coordinate their transmissions such that the reference subframe is time-synchronized between the base stations. In other words, steps 602 and 604 may be performed simultaneously.

Each of the measurement signals may be orthogonal to each other. For example, each base station may utilize a different cyclical shift of a particular Zadoff-Chu root sequence for a given resource block. Any of various other mutually orthogonal signals may also or alternatively be used. This may ensure robustness against interference across adjacent cells and facilitate differentiation of the different transmissions by the different base stations.

In 606, the first UE 106 may perform serving cell measurements and synchronization functions as well as neighboring cell measurements on the first BS 102A and the neighboring BSs 102B-N based on the measurement signals provided by the first BS 102A and the neighboring BSs 102B-N during the reference subframe. Such synchronization functions and measurements may include signal strength and/or quality measurements (e.g., RSRP and RSRQ), updating timing loops, frequency loops, Doppler and/or SINR loops, performing channel estimation, etc.

Note that in some instances, control information regarding neighboring cells may be transmitted as part of the reference subframe. This may facilitate performing measurements of all neighboring cells of a given serving cell by a UE (e.g., the first UE 106) during the reference subframe.

In some instances, the reference subframe may be a dedicated synchronization/measurement subframe; for example, the first measurement signal transmitted by the first BS 102A may span the entire reference subframe, and respective measurement signals transmitted by neighboring BSs 102B-N may similarly span the entire reference subframe.

Reference subframes may be provided by the BSs 102A-N at coordinated periodic intervals on an ongoing basis. For example, reference subframes may be scheduled for every 10 ms, or every 20 ms, or at any of a variety of other intervals. Between reference subframes the BSs 102A-N may also transmit data during data subframes, for example if any UEs (such as UE 106) are scheduled for data communications with any of the BSs 102A-N. Alternatively or in addition, the BSs 102A-N may leave one or more subframes blank (i.e., not transmit) between the reference subframes, for example if no UEs are scheduled for data communications. Because the reference subframe may provide sufficient information for UEs to perform measurement and synchronization functions, it may be the case that during some or possibly all of the subframes between the reference subframes, cell specific reference symbols may not be used. As a result, subframe symbols of data subframes which might otherwise be set aside for cell-specific reference symbols may be used as data subcarriers, which may increase spectral efficiency of communications during those subframes. Additionally, subframe symbols of blank subframes which might otherwise be used for cell-specific reference symbols may also remain blank, which may reduce interference caused to other cells during those subframes.

In some implementations, information regarding the reference subframes may be provided by one or more of the BSs 102A-N, for example in broadcast system information (e.g., so as to be available to UEs which are not yet attached to the system and/or to UEs in RRC idle mode) and/or in RRC configuration messages (e.g., for UEs which are in RRC connected mode). In such a case, the first UE 106 and/or any other UEs in the communication system may utilize such information to determine when (e.g., in which system frame number (SFN) the reference subframe falls) and how (e.g., the nature/type/index number/etc. of the signals used by the base stations 102A-N) to perform the serving cell measurements and synchronization functions and/or the neighboring cell measurements.

Alternatively, the reference subframe structure (e.g., correspondence between cell IDs and particular reference signals, reference subframe timing, etc.) may be sufficiently defined in specification documents for the wireless communication technology being used in the communication system that information which is already provided (e.g., system frame number and cell id, such as might be obtained from system information blocks broadcast by each cell) may be sufficient to enable UEs to determine when and how to utilize the reference subframe(s).

Additional Information

The following information is provided as additional description of certain possible exemplary implementations in which the communication system operates according to LTE or LTE-A and considerations related thereto, and is not intended to be limiting to the disclosure as a whole. Numerous alternatives to and variations of the following details are also possible and should be considered within the scope of the present disclosure.

In at least some instances, (e.g., for cells that will support only new releases devices), it may be possible to minimize use of CRS and substantially implement such a scheme. However, note that even if such a scheme as illustrated in and described with respect to FIG. 6 is implemented, CRS may still be used in certain circumstances, if desired. For example, while the use of a periodic, dedicated reference subframe may enable a UE to perform all needed serving and neighboring cell measurements during that reference subframe, decoding of certain channels (e.g., CRS based pre-coded channels) may continue to utilize CRS, and so CRS may be transmitted for subframes (or possibly just specific resource blocks) that contain such channels (e.g., PBCH, PHICH, PCFICH). It may be the case in such an instance that CRS are not transmitted in a wideband manner (e.g., across all resource blocks/RBs) but are rather transmitted just for those RBs containing the desired control channel. For example, for the PBCH, CRS might be transmitted only in the six resource blocks in the center of the system bandwidth. Alternatively, or in addition, certain channels that previously relied on CRS based precoding may be replaced with channels that use UE-specific reference symbols; for example, the PDCCH may be replaced by an E-PDCCH that uses UE-specific reference symbols.

As a further possibility, some cells may be provided primarily or exclusively as secondary cells (secondary component carriers) in carrier aggregation schemes. For example, an LTE-U cell (a cell deployed in an unlicensed band, which might also be an example of a cell which supports only new releases devices) be deployed as a secondary component carrier ("Scell"); such a cell may be subject to cross carrier scheduling such that control communications may be performed on the primary component carrier ("Pcell"). In such a case, the LTE-U Scell may not have a PDCCH.

As a further consideration to avoid the need for CRS, the PDSCH may use transmission modes that require UE-specific reference symbols (i.e., and do not require CRS) such as LTE transmission modes 7-10. Additionally, CQI/PMI/RI measurements may be based on LTE Release 10 defined Channel State Information-Reference Symbols (CSI-RS).

It may also be possible to implement dedicated reference subframes in a manner which co-exists substantially with the use of CRS, for example in order to continue providing support for legacy devices which are not configured to utilize such a reference frame and/or which require CRS for certain purpose. For example, if desired (e.g., in cells that will support both new releases devices and legacy devices), when no UEs are scheduled for data communications, it may be the case that CRS are not transmitted, and that reference subframes will be transmitted according to configured (e.g., as defined according to radio resource control (RRC) messages) characteristics. When UEs are scheduled for data communications, however, CRS may be used.

The reference subframe may be designed in any of a variety of ways. As a first example, the design may be based on Zadoff-Chu (ZC) sequences, such as provided according to the following equation:

$$x_u(n) = e^{-j\frac{\pi u n(n+1)}{N_{ZC}}}, 0 \leq n \leq N_{ZC} - 1,$$

where u=physical root sequence index

In this case, the orthogonality of measurement signals between cells may be ensured by the cyclic shifts of ZC sequences of the same root and by frequency domain division. For example, for a given resource block (RB), the same ZC root sequence is used for each cell, but each cell may be assigned a different cyclic shift of the root to ensure that the signals used by the different cells are orthogonal to each other. Different root sequences may be used for different resource blocks.

Note that such a reference sequence may span a whole subframe (two slots) or half of a subframe (one slot). In the case in which the reference sequence spans half of a subframe, each cell may be identified by two different sequences (e.g., one per slot); alternatively, the same sequence may be repeated in the time domain (e.g., for time diversity), and/or in a different resource block in the second slot (e.g., for frequency diversity) to form the measurement signal. Such "hopping" in the frequency domain may be static (e.g., known/defined in advance) or dynamic (e.g., signaled in RRC communications).

Note also that if the length of a reference sequence is not equal to (e.g., is greater or lesser than) the number of subcarriers available in a single RB, then the subcarrier spacing could be changed (e.g., shortened or lengthened) for the reference subframe, if desired.

Thus, in this example, a given cell's measurement signal may be defined and orthogonality with respect to other cells measurement signals ensured by the combination of the RB index, the ZC root sequence, and the root cyclic shift.

As an alternate example, reference symbol sequences as of 3GPP Release 8 could be used. Orthogonality may be ensured in such a case by using frequency domain division (FDM) in addition to code domain division (CDM). The concept may be similar to that used for CSI-RS. In this example, then, a given cell's measurement signal may be defined and orthogonality with respect to other cells measurement signals ensured by the combination of the reference symbol sequence, the CDM index and the RB index.

It should further be noted that, if desired (e.g., due to a finite set of orthogonal sequences and/or codes), a time domain offset for the transmission of the reference subframe could be used for each of various groups of cells. For example, a first group of cells could transmit in SFN k, while a second group could transmit in SFN j (e.g., where j and k are different numbers), etc. The groups of cells may be geographically coordinated such that in most cases, all neighboring cells may be synchronized (i.e., may transmit their reference subframes in the same SFN as each other), in order to provide UEs with the capability to perform all serving and neighboring cell measurements during the reference subframe.

As previously noted, a mapping between a given cell (e.g., having a particular cell ID) and the sequence/signal used for the reference subframe by that cell could be defined in a static manner (e.g., in the 3GPP specification), or provided dynamically using configuration messages.

In the case of dynamic configuration, the configuration information may be transmitted in an RRC message and/or in system information block (SIB) information (e.g., since it may be used in both idle and connected modes). Such configuration information might include a list of neighboring cells, their cell IDs, and a sequence/signal index (or other indicator) identifying the signal used for the reference subframe by each such cell, as one possibility. The configuration may also include one or more of the SFN starting time, the periodicity of reference subframes, and the subframe pattern in a cycle.

As a specific example, below is an exemplary RRC information element ("IE") "MeasSubframePattern" which may be used to indicate such information. Note that while the following example represents one possible configuration message, numerous alternatives to and variations of the following example are also possible.

| MeasSubframePattern |
|---|
| The IE MeasSubframePattern is used to specify a subframe pattern. The first/leftmost bit corresponds to the subframe #0 of the radio frame satisfying SFN mod x = 0, where SFN is that of PCell and x is the size of the bit string divided by 10. "1" denotes that the corresponding subframe is used. |
| MeasSubframePattern information element |

```
--ASN1START
MeasSubframePattern-r10::=CHOICE {
    subframePatternFDD-r10        BIT STRING (SIZE (40)),
    subframePatternTDD-r10        CHOICE {
        subframeConfig1-5-r10         BIT STRING (SIZE (20)),
        subframeConfig0-r10           BIT STRING (SIZE (70)),
        subframeConfig6-r10           BIT STRING (SIZE (60)),
        ...
    },
    ...
}
```

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   a processor configured to cause a base station to:
   periodically transmit first dedicated synchronization and measurement subframes according to a configured periodicity, during a time period when no data communications are performed by a first cell of the base station, to one or more wireless devices in a coverage area corresponding to the first cell;
   wherein the first dedicated synchronization and measurement subframes are a subset of a plurality of dedicated synchronization and measurement subframes, wherein each of the plurality of dedicated synchronization and measurement subframes includes reference signals;
   wherein the first dedicated synchronization and measurement subframes are transmitted by the base station when other ones of the plurality of dedicated synchronization and measurement subframes are periodically transmitted by other cells during the time period according to the configured periodicity, wherein no data communications are performed by the other cells during the time period; and wherein the first cell is entirely silent in-between transmissions of the plurality of dedicated synchronization and measurement subframes during the time period, wherein the first cell does not transmit when it is entirely silent.

2. The apparatus of claim 1, wherein the first cell operates according to a cellular radio access technology in an unlicensed frequency band.

3. The apparatus of claim 1, wherein the processor is configured to further cause the base station to:
transmit data subframes when data communications are performed by the first cell, wherein at least a subset of the data subframes do not include cell specific reference symbols.

4. The apparatus of claim 3, wherein the first dedicated synchronization and measurement subframes have modified subcarrier spacing relative to the data subframes.

5. The apparatus of claim 1, wherein the one or more wireless devices use the reference signals comprised in the plurality of dedicated synchronization and measurement subframes to perform cell measurements of the first cell and the other cells during each periodically transmitted plurality of dedicated synchronization and measurement subframes.

6. The apparatus of claim 1, wherein reference signals transmitted by the other cells in the plurality of dedicated synchronization and measurement subframes are orthogonal with respect to reference signals transmitted by the base station in the plurality of dedicated synchronization and measurement subframes.

7. The apparatus of claim 1, wherein the processor is configured to further cause the base station to:
transmit configuration information for the first dedicated synchronization and measurement subframes, wherein the configuration information indicates the configured periodicity.

8. The apparatus of claim 7, the processor is configured to further cause the base station to:
broadcast the configuration information in a system information block (SIB); or
transmit the configuration information in a radio resource control (RRC) information element.

9. A non-transitory memory element storing programming instructions executable by a processor to cause a base station to:
periodically transmit first dedicated synchronization and measurement subframes according to a configured periodicity, during a time period when no data communications are performed by a first cell of the base station, to one or more wireless devices in a coverage area corresponding to the first cell;
wherein the first dedicated synchronization and measurement subframes are a subset of a plurality of dedicated synchronization and measurement subframes, wherein each of the plurality of dedicated synchronization and measurement subframes includes reference signals;
wherein the first dedicated synchronization and measurement subframes are transmitted by the base station when other ones of the plurality of dedicated synchronization and measurement subframes are periodically transmitted by other cells during the time period according to the configured periodicity, wherein no data communications are performed by the other cells during the time period; and
wherein the first cell is entirely silent in-between transmissions of the plurality of dedicated synchronization and measurement subframes during the time period, wherein the first cell does not transmit when it is entirely silent.

10. The non-transitory memory element of claim 9, wherein the first cell operates according to a cellular radio access technology in an unlicensed frequency band.

11. The non-transitory memory element of claim 9, wherein the programming instructions executable by the processor to further cause the base station to:
transmit data subframes when data communications are performed by the first cell, wherein at least a subset of the data subframes do not include cell specific reference symbols.

12. The non-transitory memory element of claim 11, wherein the first dedicated synchronization and measurement subframes have modified subcarrier spacing relative to the data subframes.

13. The non-transitory memory element of claim 9, wherein the one or more wireless devices use the reference signals comprised in the plurality of dedicated synchronization and measurement subframes to perform cell measurements of the first cell and the other cells during each periodically transmitted plurality of dedicated synchronization and measurement subframes.

14. The non-transitory memory element of claim 9, wherein reference signals transmitted by the other cells in the plurality of dedicated synchronization and measurement subframes are orthogonal with respect to reference signals transmitted by the base station in the plurality of dedicated synchronization and measurement subframes.

15. The non-transitory memory element of claim 9, wherein the programming instructions executable by the processor to further cause the base station to:
transmit configuration information for the first dedicated synchronization and measurement subframes in one or more of:
broadcast the configuration information in a system information block (SIB); or
a radio resource control (RRC) information element;
wherein the configuration information indicates the configured periodicity.

16. An apparatus comprising:
a processor configured to cause a device to:
receive reference signals from each cell of a plurality of cells in a plurality of dedicated reference subframes periodically transmitted by the plurality of cells according to a configured periodicity during a time period when no data communications are performed by the plurality of cells, wherein the reference signals from each cell are orthogonal with respect to the reference signals from each other cell of the plurality of cells, wherein each of the plurality of periodically transmitted dedicated reference subframes comprises a corresponding subset of the reference signals, wherein at least one cell of the plurality of cells is entirely silent in-between transmissions of corresponding ones of the plurality of dedicated reference subframes by the at least one cell, wherein the at least one cell does not transmit when it is entirely silent; and
perform cell measurements on the plurality of cells based on the received reference signals during each periodically transmitted plurality of reference subframes.

17. The apparatus of claim 16, wherein the plurality of cells operate according to a cellular radio access technology and the at least one cell operates in an unlicensed frequency band.

18. The apparatus of claim 16, wherein the processor is configured to further cause the device to perform, based on the received reference signals, one or more of the following:
- a time tracking loop update;
- a frequency tracking loop update;
- a Doppler loop update;
- a SINK loop update;
- a signal strength measurement;
- a signal quality measurement; or
- channel estimation.

19. The apparatus of claim 16, wherein the processor is configured to further cause the device to:
- receive configuration information for the plurality of periodically transmitted dedicated reference subframes, wherein the configuration information indicates:
- timing of the periodically transmitted dedicated reference subframes; and
- information identifying respective reference signals used by each of the plurality of cells.

20. The apparatus of claim 16, wherein the processor is configured to further cause the device to:
- receive data from a serving cell of the plurality of cells during data subframes transmitted by the serving cell when the serving cell performs data communications, wherein at least a subset of the data subframes do not include cell-specific reference symbols.

* * * * *